(12) United States Patent
Glassman

(10) Patent No.: US 10,876,296 B2
(45) Date of Patent: Dec. 29, 2020

(54) METHOD OF ASSEMBLY OF MODULAR STAIR ASSISTANCE DEVICE FOR PETS

(71) Applicant: Nancy R. Glassman, Valley Stream, NY (US)

(72) Inventor: Nancy R. Glassman, Valley Stream, NY (US)

(*) Notice: Subject to any disclaimer, the term of this patent is extended or adjusted under 35 U.S.C. 154(b) by 115 days.

(21) Appl. No.: 16/236,380

(22) Filed: Dec. 29, 2018

(65) Prior Publication Data

US 2019/0203476 A1 Jul. 4, 2019

Related U.S. Application Data

(60) Provisional application No. 62/611,742, filed on Dec. 29, 2017.

(51) Int. Cl.
| | |
|---|---|
| *E04F 11/02* | (2006.01) |
| *E04F 11/035* | (2006.01) |
| *A01K 29/00* | (2006.01) |
| *E04F 11/00* | (2006.01) |
| *E04F 11/025* | (2006.01) |
| *E04F 11/022* | (2006.01) |
| *E04F 11/104* | (2006.01) |

(52) U.S. Cl.
CPC ............ *E04F 11/035* (2013.01); *A01K 29/00* (2013.01); *E04F 11/002* (2013.01); *E04F 11/022* (2013.01); *E04F 11/025* (2013.01); *E04F 2011/005* (2013.01); *E04F 2011/007* (2013.01); *E04F 2011/0203* (2013.01); *E04F 2011/1048* (2013.01)

(58) Field of Classification Search
CPC .............. A01K 29/00; A61H 2003/001; A61H 2201/0107; B66B 9/0869; E04F 11/002; E04F 11/022; E04F 11/025; E04F 11/09; E04F 2011/008; E04F 2011/007; E04F 2011/0203; E04F 2011/1048
USPC ....... 52/184, 188, 190, 741.2; 119/843, 847; 182/159
See application file for complete search history.

(56) References Cited

U.S. PATENT DOCUMENTS

| | | | | |
|---|---|---|---|---|
| 2,009,595 | A | * | 7/1935 | Der Pyl Van ......... E04F 11/166 52/181 |
| 2,044,260 | A | * | 6/1936 | Schiele ................. E04F 11/022 52/184 |
| 2,218,523 | A | * | 10/1940 | Byington .............. E04F 11/025 52/189 |

(Continued)

FOREIGN PATENT DOCUMENTS

GB    2530248 A    3/2016

OTHER PUBLICATIONS

Cat Stair, Etsy, Jun. 11, 2017, "https://www.etsy.com/listing/588307861".

(Continued)

*Primary Examiner* — Brian E Glessner
*Assistant Examiner* — James J Buckle, Jr.
(74) *Attorney, Agent, or Firm* — Robert J. Hess; Hess Patent Law Firm

(57) ABSTRACT

A pet staircase may be formed by joining modular units to each other in succession and that overlie a household staircase. They are retained in position over the household staircase. Each modular unit has stairs and/or ramps. The treads may be adjusted so that they all are parallel to each other and extend horizontally.

17 Claims, 4 Drawing Sheets

(56) References Cited

U.S. PATENT DOCUMENTS

| | | | | |
|---|---|---|---|---|
| 2,221,358 A * | 11/1940 | Neal | ............ | E04F 11/022 52/190 |
| 3,007,283 A * | 11/1961 | Holland | ............ | E04F 11/022 52/190 |
| 3,023,049 A | 2/1962 | Hilliard | | |
| 3,055,146 A * | 9/1962 | Lobato | ............ | E04G 13/06 52/190 |
| 3,099,336 A * | 7/1963 | Hawkins | ............ | E04F 11/035 52/182 |
| 3,498,012 A * | 3/1970 | Seegers | ............ | B28B 7/0029 52/189 |
| 3,978,628 A * | 9/1976 | Turner | ............ | E04F 11/025 52/188 |
| 4,004,384 A * | 1/1977 | Hood | ............ | E04F 11/025 52/188 |
| 4,425,601 A * | 1/1984 | Donahue | ............ | F21V 33/006 362/146 |
| D287,283 S * | 12/1986 | Johnson | ............ | E04F 11/0201 182/228.1 |
| 4,959,935 A | 10/1990 | Stob | | |
| 5,355,904 A * | 10/1994 | Wallum | ............ | A61H 3/00 135/65 |
| 5,454,196 A | 10/1995 | Gaines | | |
| 5,592,801 A | 1/1997 | Balzer | | |
| 5,634,440 A | 6/1997 | Mogck | | |
| 5,664,379 A * | 9/1997 | Kroll | ............ | E04F 11/02 52/183 |
| 5,778,610 A * | 7/1998 | Berg | ............ | E04F 11/041 52/105 |
| 5,870,788 A | 2/1999 | Witkin | | |
| 5,941,342 A | 8/1999 | Lee | | |
| 6,964,246 B2 | 11/2005 | Wolfington | | |
| 7,621,236 B2 | 11/2009 | Steffey | | |
| 7,686,138 B2 | 3/2010 | Schmidt | | |
| D673,299 S * | 12/2012 | Balducki | ............ | D25/63 |
| 9,212,491 B1 * | 12/2015 | Santini | ............ | E04F 11/035 |
| 10,434,028 B2 * | 10/2019 | Barto | ............ | A61H 3/00 |
| 2003/0154669 A1 | 8/2003 | Vandaan | | |
| 2005/0141225 A1 * | 6/2005 | Striebel | ............ | F21S 4/28 362/382 |
| 2005/0172568 A1 * | 8/2005 | Crandall | ............ | H05B 47/105 52/187 |
| 2006/0137266 A1 | 6/2006 | Whalen | | |
| 2007/0089690 A1 * | 4/2007 | Khubani | ............ | A01K 1/035 119/847 |
| 2007/0289556 A1 | 12/2007 | Hoffman | | |
| 2009/0139798 A1 * | 6/2009 | Bernard | ............ | E06C 7/003 182/18 |
| 2009/0188444 A1 | 7/2009 | Whalen | | |
| 2009/0213580 A1 * | 8/2009 | Hartman | ............ | F21V 33/006 362/147 |
| 2009/0293385 A1 * | 12/2009 | Vargas | ............ | E04F 11/025 52/191 |
| 2010/0287854 A1 * | 11/2010 | Couture | ............ | E04F 11/02 52/184 |
| 2011/0232214 A1 * | 9/2011 | Lin | ............ | E04F 11/0201 52/188 |
| 2012/0073908 A1 | 3/2012 | Rosenthal | | |
| 2012/0167521 A1 * | 7/2012 | Cretti | ............ | E04F 11/022 52/741.2 |
| 2013/0047937 A1 | 2/2013 | Chery | | |
| 2013/0111663 A1 | 5/2013 | Brown | | |
| 2018/0100312 A1 * | 4/2018 | Halischuk | ............ | E04F 11/166 |
| 2018/0274241 A1 * | 9/2018 | Opp, Jr. | ............ | E04G 13/062 |
| 2018/0305935 A1 * | 10/2018 | Halischuk | ............ | E04F 11/175 |
| 2019/0150400 A1 * | 5/2019 | Kumar | ............ | A01K 1/0272 |

OTHER PUBLICATIONS

Meg Marrs, Best Pet Stairs & Ramps to Help Your Dog Around the house, k9 of Mine, Aug. 26, 2018, https://www.k9ofmine.com/best-pet-stairs/.

Jessica Zernike, Outdoor Dog Ramp, Visual hunt, Sep. 12, 2018, https://visualhunt.com/outdoor-dog-ramp.

* cited by examiner

METHOD OF ASSEMBLY OF MODULAR STAIR ASSISTANCE DEVICE FOR PETS

CROSS-REFERENCE TO RELATED APPLICATIONS

U.S. provisional patent application No. 62/611,742, filed Dec. 29, 2017, from which the present application claims the benefit of priority.

STATEMENT REGARDING FEDERALLY SPONSORED RESEARCH OR DEVELOPMENT

Not applicable.

THE NAMES OF THE PARTIES TO A JOINT RESEARCH AGREEMENT

Not applicable.

REFERENCE TO A "SEQUENCE LISTING," A TABLE, OR A COMPUTER PROGRAM LISTING APPENDIX SUBMITTED ON A COMPACT DISC AND AN INCORPORATION-BY-REFERENCE

Not applicable.

BACKGROUND OF THE INVENTION

1. Field of Endeavor to which the Invention Pertains

The invention pertains to an adjustable and modular stair assembly for pets and a method of forming a modular stair assembly for pets.

2. Description of Information Known to the Inventor, Including References to Specific Documents Related to the Invention, and Specific Problems Involved in the State of Technology that the Invention is Drawn Toward Some domestic household pets, such as dogs and cats, have difficulty traversing steps of a household staircase because the height between successive steps is too steep for them. Pets may find themselves stuck at the top or bottom of the household staircase either because they are too fearful to go up or down because the height is too steep or they perceive the height to be too steep to traverse without injuring themselves.

Pet ramps are known that are sized the full length of a staircase from the bottom to a landing and are placed over a portion of the width of staircase so as to extend the full length of the staircase. Such pet ramps may be custom built and sized to run the full staircase length accordingly. In some cases, they are custom built into the home and in effect become part of the home itself because they are secured in a permanent manner. One example of a portable pet ramp is disclosed in U.S. Pat. No. 5,870,788, US Patent Application Publication No. US 2013/0047937 A1 discloses a retractable (vertical/horizontal) pet ramp with accessed lighting.

U.S. Pat. No. 5,592,801, whose discussions in its Background of the Invention and its Summary of the Invention in their entireties are incorporated herein by reference, discloses a mobile stair system for pets and other small animals, a method of making said mobile stair system, and a method of producing elements of said mobile stair system. U.S. Pat. No. 8,091,294 B2 discloses a folding pet staircase whose stair treads are operatively connected by articulating links that allow for tread pivoting in unison between a stowed position and a deployed position.

The present inventor has made some observations. The customization of household (human) staircase to include a pet staircase alongside is a costly undertaking but, if implemented, is a solution to the problem of making it easier for household pets to go up or down between landings of a staircase. However, that solution is not available to everyone even if sufficient funds are available to do so.

For instance, the homeowner may not want to permanently alter the structure of the home staircase by replacing a portion of that staircase with a pet staircase and would prefer some less permanent alternative. In the case of the homeowner being landlord and the tenant being the one who desires a pet staircase, the installation of a customized pet staircase to replace a portion of the original (human) staircase simply would not be viable without the landlord's consent. Even if a permanent pet staircase is installed alongside the remaining portion of the original (human) staircase, as a practical matter, it would not be taken away by the homeowner or tenant to be used in a new abode that the homeowner or tenant may be moving to in the future.

It is desired to provide for a pet staircase on a household (human) staircase in a secure manner that does not replace any portion of the household (human) staircase and thereby leave it intact.

SUMMARY OF THE INVENTION

The present invention provides assembly of one or more modular stair assistance devices for domesticated animals. The modular stair assistance devices are placed on existing staircases, and can be configured as half-steps (or other suitably sized steps) between each stair, for example, to allow pets to move up and down more easily upon a household (human) staircase that has full steps. The devices are clearly visible to people and preferably require a person or animal to perform some action, such as to open a gate, before accessing the modular stair assistance devices.

Moreover, the assembly of the present invention is secured firmly to existing stairs. As such, pets and pet owners are less likely to dislodge the assembly inadvertently from the assembly's position on the stair, which can result in the pet or pet owner slipping or falling on the staircase.

Further, the modular stair assistance device is readily interchangeable with other modular stair assistance devices that have either the same or different exterior appearance. This enables ready replacement of damaged modular stair assistance devices or exchanging them to provide a change in appearance. In the latter case, it may be desired to provide a holiday theme for the modular stair assistance devices during holiday seasons. For examples, alternating colors of the treads.

BRIEF DESCRIPTION OF THE DRAWINGS

For a better understanding of the present invention, reference is made to the following description and accompanying drawings, while the scope of the invention is set forth in the appended claims.

DETAILED DESCRIPTION OF THE INVENTION

Figure 1:
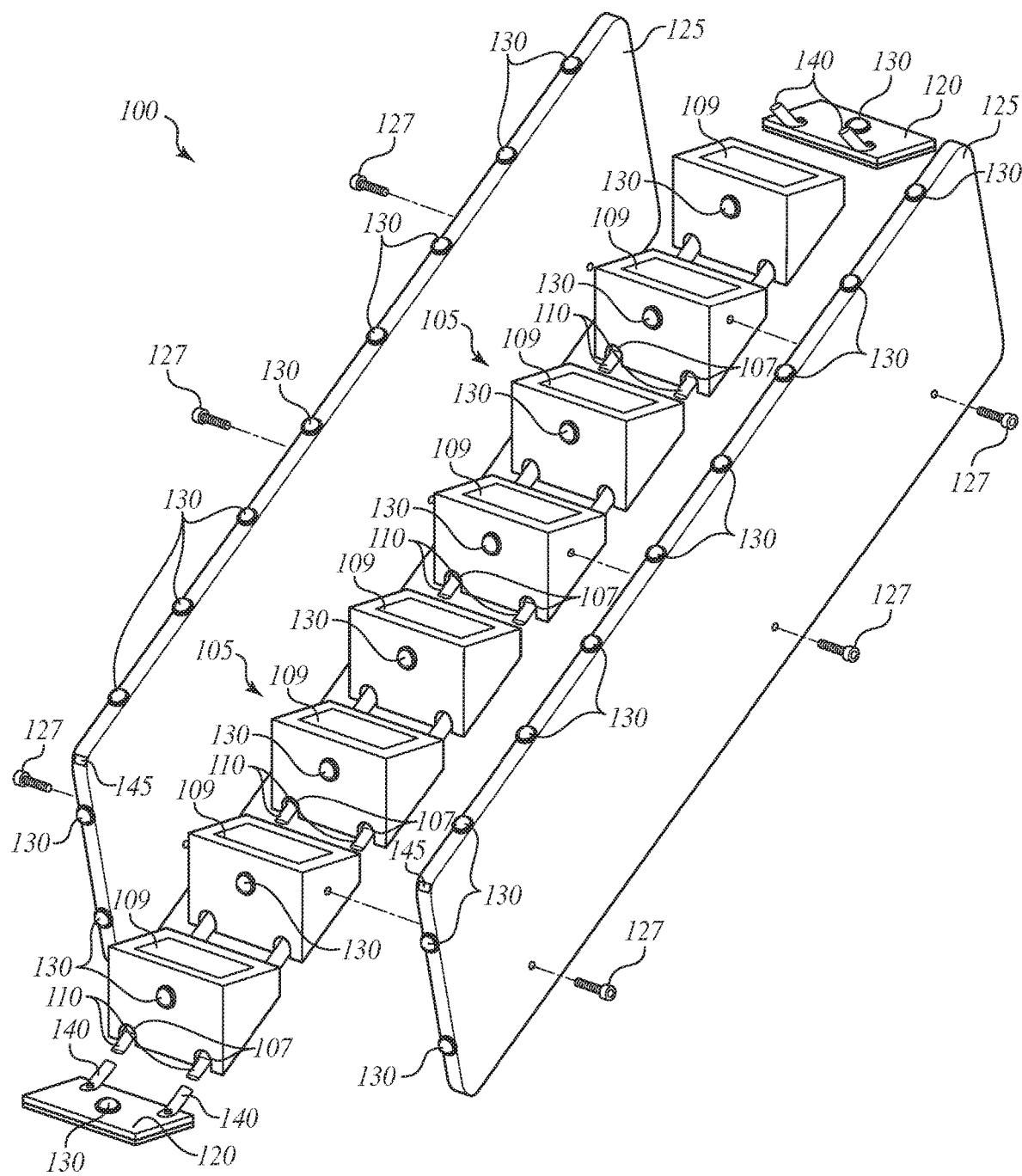
FIG. 1 is an exploded, top isometric view of a modular stair assistance accessory in accordance with an embodiment of the invention.
Figure 2:
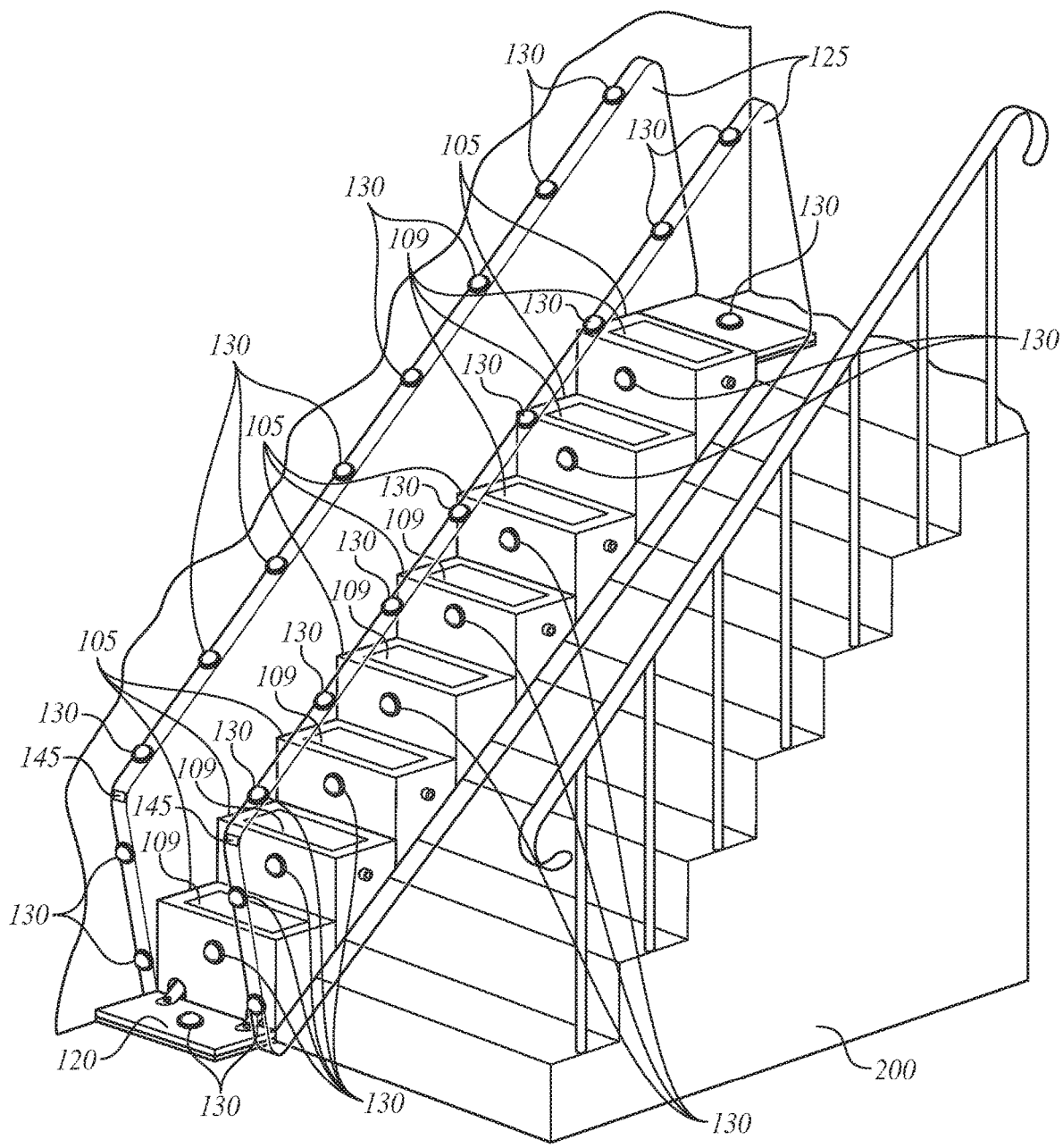
FIG. 2 is an isometric view of the modular stair assistance accessory of FIG. 1 secured in position upon household stairs.
Figure 4:
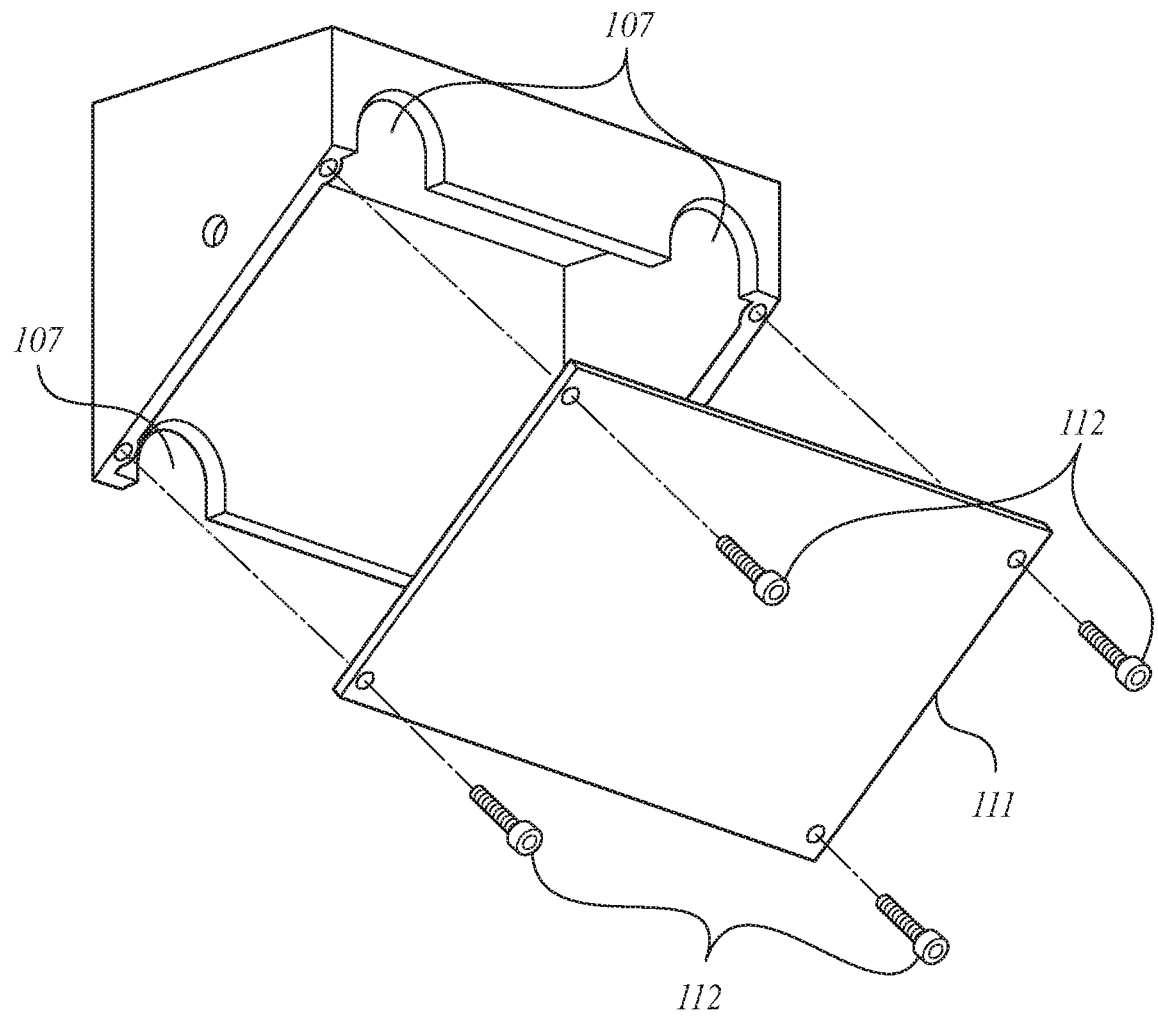
FIG. 4 is an exploded, isometric bottom view of a modular stair assistance accessory in accordance with the invention.

FIG. 1 shows a stair assembly 100 that includes one or more stair modules 105, each stair module 105 having one or more steps for an animal to climb up or down. Ultimately, the stair modules 105 will be supported by a pair of support members 110 that connect with complementary pairs of other support members of neighboring stair modules 105 and placed over a household staircase 200 as shown in FIG. 2. Preferably, the underside of the front and rear of each stair module 105 each have a respective pair of recesses 107 (see FIG. 4) that align with themselves accordingly as pairs and accommodate placement of the pair of support members 110 therein. Rubber or other elastic material should be applied to the recesses that compress against the support members 110 after a base plate 111 is secured to the underside of each stair module 105 with conventional fasteners 112 such as screws. The compressive force helps retain the support members 110 in their relative position. Another option would be to widen that portion of the support members 110 within the confines of the stair module 110 so the portion can't fit through the recesses 107 once the base plate 111 is secured. Of course, the protruding end portions of the support members 110 can fit through.

Figure 3:
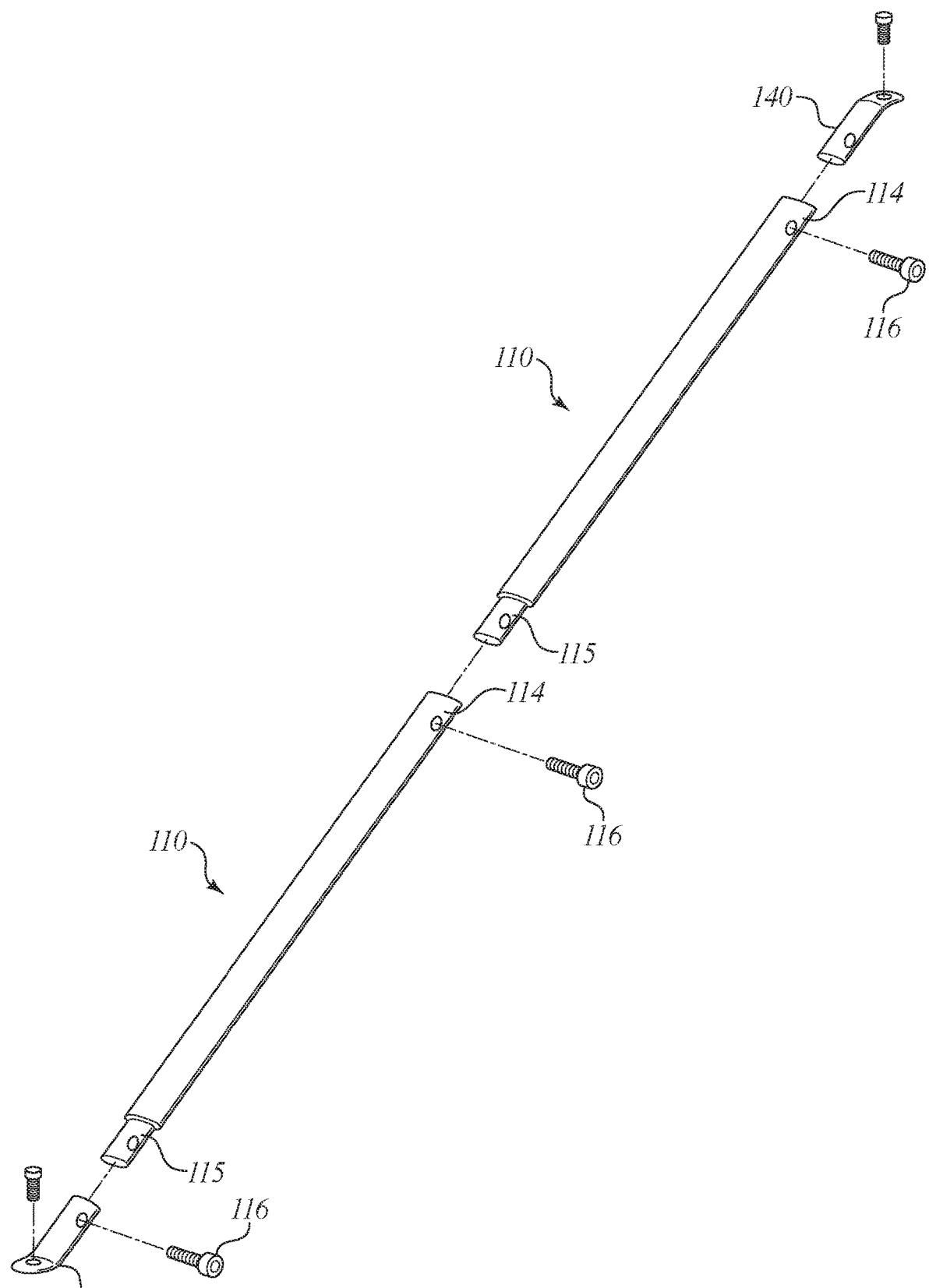
FIG. 3 is an exploded, isometric top view of a support member in accordance with the invention.

The stair modules 105 are preferably connected to one another via one or more of the support members 110 in succession. As shown in FIG. 3, the support members 110 can be configured as hollow tube members each having two ends 114, 115 with one of the two ends 114 being wider than that of the other of the two ends 115. That way, the narrower one of the ends 115 of one of the hollow tube members can fit into a wider one of the ends 115 of a neighboring one of the hollow tube members and fastened to each other with a conventional fastener 116 that fits into aligned holes in the ends. When fully assembled, the successively connected support members 100 form in effect a pair of unified structures, such as rails, that each extend the full length of the stair assembly 100 or at least the full distance between the mounting members 120.

If desired, the multiple support members 110 could be replaced by a pair of single piece structures that are as long as the unified structures would be. Alternately, the replacement may be a pair of telescoping structures that when fully extended are as long as the unified structures would be. For added stability, a horizontal strip of hook and loop fasteners may be applied to the bottom front portion of each step riser to engage with a strip of hook and loop fasteners applied to the rear facing edge of each step tread. That may help counter any twisting motion from the support members that may arise during use as a pet uses the step modules 105. That is, as shown in FIG. 2, the region where the bottom front face of each step riser of a step module presses against the rear of the step tread of a neighboring step module 105 is where the strips of hook and loop fasteners are applied to face each other and press into engagement with each other.

A pair of stringers (not shown) may be provided with one slidable along the other and each connected to a widthwise end of the treads of the stairs in the manner of U.S. Pat. No. 4,959,935, whose contents are incorporated by reference with respect to adjusting the step treads in unison to arrange them substantially horizontal to accommodate different angles of inclination of the staircase itself. Once a desired orientation of the step treads is attained, the stringers are secured to each of the step treads with a guide to prevent them from sliding further relative to each other and keep them in a fixed relative relation to each other. The step risers may be made of a flexible fabric and attached to the step tread edges with loop and hook fasteners and should be taut. If the risers are inflexible, they may be pivoted to the step tread that is above and slidably retained to the step tread below to slide back and forth and long enough to block the space between the neighboring steps no matter what the angle of inclination of the treads happens to be. That means a portion of the step riser will extend to an elevation lower than the lower step tread to which it is slidably retained.

Turning to FIG. 2, multiple stair modules 105 can be connected to together to form an uninterrupted assembly. The stair modules 105 can be made of one or more types of materials, such as one or more types of plastics, molded plastics, wood, metal, or other suitable material. The steps of each stair member 105 can include a molded soft tread 109 configured on top of the steps of the stair member 105, as shown in FIG. 2. The soft tread 109 is of conventional construction to provide cushioning to provide comfort and safety for an animal or person while traversing or standing on the stair assembly 100.

Referring again to FIG. 1, the support members 110 can be configured to removably attach to mounting members 120 that are placed on respective upper and lower landings of the staircase. Each mounting member 120 has its own pair of support members 140 that engage with a pair of support members 110 of a neighboring stair module 105 (see FIGS. 1 and 3). While the entire stair assembly 100 could rest upon the steps of the household staircase 200, chances are the stair assembly 100 will be elevated without touching the steps themselves of the household staircase 200. This is because the household staircase 200 may not be uniform throughout as to its step riser height or step dread depth or the household staircase 200 may have broken portions or the landings may not be horizontal. Thus, the support members 140 of the mounting members 120 may need to be adjustable to accommodate.

To change the length of the support members 140 and thus alter the height that the stair assembly 100 is raised, each support member 140 may have two parts that threadably engage each other so that turning one of the two parts relative to the other in clockwise or counterclockwise directions as applicable will alter the effective length of the support members 140. The concept is the same as is done conventionally for adjusting the length of furniture legs.

However, just changing the effective length of the support members 140 of the mounting member 120 alone may not be effective depending upon the rise of the household staircase 200 and angle of the staircase landings. To compensate, the support members 140 may need to pivot and their connecting linkage may need to articulate to ensure a secure fit with the support members 110 of the stair modules 105. In that sense, the support members 140 could be equipped with a conventional mechanism such as that for a kneeler for a church pew, as exemplified by U.S. Pat. No. 3,023,049, whose contents are incorporated herein by reference, which allows the angling at an intermediate position to be retained that is between the full-down or full-up position.

Each mounting member 120 may be either (1) a friction resistance mat that resists movement along the landing or (2) a material equipped with conventional hook and loop fasteners arranged on the underside to engage with other conventional hook and loop fasteners that are arranged on the topside on the landings (such as adhered to the landings) or (3) magnetic material that magnetically attracts to a magnetic material within or upon the landings. The mounting members 120 could be secured with conventional fasteners to the landings, such as with conventional bolts, nails or screws, or be adhered to the landings.

In one or more embodiments, the assembly can further include one or two soft walls 125 that are removably attachable to one or more of the one or more stair modules 105 and/or the mounting members 120 and may be as long as the entire stair assembly 100 or somewhat shorter in length. The soft wall 125 can attached to the stair modules 105 and/or the mounting members 120 in any number of different ways, such as via an adhesive and/or fasteners (e.g., hook and loop fasteners) or screws 117. Although not shown, the soft walls 125 may be divided into separate parts that are attachable to each other. That way, each stair module 105 can have its own separate part of the soft walls 125 that can attach to neighboring separate ports of soft walls of other stair modules 105. The separate parts of the soft walls 125 may be connected to each other in any conventional manner such as with fasteners or adhesives. Such fasteners may be hook and loop fasteners or be configured for male and female engagement and locked into position in a manner similar to connecting adjoining panels to each other with hardware when assembling conventional furniture.

In one or more embodiments, the soft wall 125 can be made of cushioned or padded material, for example. The soft wall 125 acts as a physical barrier to prevent people from moving onto the assembly 100 while on the existing staircase, which could result in an injury. The soft wall 125 also acts a physical barrier to prevent an animal from transferring from the assembly 100 to the existing staircase while moving up or down the stairs, thereby preventing injury to the animal.

Further, in embodiments in which the soft wall 125 is cushioned or padded, the soft wall 125 can provide additional protection for the animal and the people on either side of the wall 125. As such, the soft wall 125 helps to prevent injury of pets and pet owners alike. If desired, the soft wall 125 may be given visual contrast cues by using different colors. The soft wall 125 may be a screw less design and inserted into the modular units such as in slots (not shown) in the modular units.

The height of the soft wall 125 can vary based on the size and shape of the existing staircase, as well as the size of the animal using the assembly 100. In at least one embodiment, the height off the soft wall 120 can be adjustable with any conventional height adjustment assembly. In one or more embodiments, the soft wall 125 is positioned such that it does not abut the railing of the existing staircase, as exemplified in FIG. 2. This placement of the soft wall 120 allows people who are using the existing staircase to have access to the railing of the existing staircase.

The stair assembly 100 can optionally include at least one gate (not shown) for selectively blocking the assembly 100 at the top and/or bottom of the staircase or flight of stairs. The gate can be in the form of a swinging gate or an accordion type gate, for example, configured to selectively attach to the stair assembly 100 or the floor in front of the assembly at the top of the staircase and/or the bottom of the staircase. As such, the gate can prevent animals and small children, for example, from going up or down the assembly. The at least one gate can be used, for example, if a small child is in the house and a parent or guardian does not want the child to move up or down the assembly. Further, the gate can be utilized to prevent the pet from using the assembly at certain times at the preference of the pet owner. The gate can also act as a barrier to anyone from accidentally moving up or down the stair assembly 100.

If desired, ramp modules may replace some or all of the stair modules 105. The ramp modules have a flat top that replaces the stairs of the stair modules 105. The ramp modules and the stair modules 105 may be referred collectively as modular units. In addition, the modular units may be designed to transform into either ramps or steps as desired by moving the treads and risers into a common plane for ramps or angled relative to each other for steps.

If desired, the stair assembly 100 may be equipped with a plurality of battery powered lights 130 that may be colored or shine through translucent material that may be colored. The soft wall 125 may be translucent or transparent to allow light shining from some of the battery powered lights 130 to shine through. Any conventional motion detector 145 may be provided to one or more of the stair modules 105 or to one or both of the walls 125 whose circuitry communicates with the battery powered lights 130 to trigger illuminating them upon detecting motion. The conventional motion detector 145 (See FIGS. 1 and 2) may also be equipped with a light sensor so that the battery powered lights 130 are only illuminated by the motion detector 145 detecting motion when the light sensor senses darkness. For instance, the lights 130 could be wired to the motion detector circuitry or be in wireless communication with each other. U.S. Pat. No. 10,154,555, whose contents are incorporated herein by references, discloses an arrangement for power outage lighting management that triggers light illumination based on sensing motion within an environment.

If desired, the pair of support members could be replaced by a single support member extending through two aligned recesses (not shown) at the center of the front and rear of each of the stair modules 105.

While the foregoing description and drawings represent the preferred embodiments of the present invention, various changes and modifications may be made without departing from the scope of the present invention.

What is claimed is:

1. A method of assembly over a household staircase, comprising the steps of:
    attaching mounting members to two landings between which is a household staircase;
    securing at least one support member to the mounting members as the mounting members attach to the two landings;
    supporting the plurality of modular units with at least one supporting member as the mounting members are secured to at least one supporting member; and
    elevating the plurality of modular units above the household staircase without the modular units touching the household staircase as the at least one supporting member supports the plurality of modular units and as the mounting members secure to the at least one support member and attach to the two landings; and
    retaining the plurality of modular units in their relative position so as to neighbor each other in succession, whereby the modular units define a travel path for pets to travel between the two landings over the household staircase.

2. The method of claim 1, wherein each modular unit of the plurality of modular units include a stair having a tread and a riser pivotally connected to each other.

3. The method of claim 1, wherein the plurality of modular units include at least two modular units that each have a respective exterior layer whose appearance differs from that of each other with respect to color, texture or both.

4. The method of claim 1, wherein the retaining includes fastening together each modular unit of the plurality of modular units with each other in succession.

5. The method of claim 4, wherein the fastening together includes aligning fastening components with each other and inserting one into another.

6. The method of claim 1, further comprising:
connecting end ones of the plurality of modular units to respective ones of the mounting members.

7. The method of claim 1, further comprising:
illuminating lights that are supported by the plurality of modular units.

8. The method of claim 7, further comprising:
activating a motion detector, and
effecting the illuminating in response to the motion detector detecting motion.

9. The method of claim 1, further comprising:
securing at least one wall to the modular units that extends to an elevation higher than an elevation of the modular units.

10. The method of claim 9, further comprising:
illuminating lights that are supported by the at least one wall.

11. The method of claim 10, further comprising:
activating a motion detector, and
effecting the illuminating in response to the motion detector detecting motion.

12. The method of claim 1, wherein each modular unit of the plurality of modular units has respective pairs of recesses that are in alignment with each other, further comprising:
positioning the at least one support member in the respective pairs of recesses so that portions of the at least one support member protrudes out of the respective pairs of recesses.

13. The method of claim 1, further comprising:
sliding the plurality of modular units on the at least one support member; and
preventing the plurality of modular units from sliding off the at least one support member by abutting at least one modular unit of the plurality of modular units against one of the end members.

14. The method of claim 1, further comprising:
compressing a resilient material between the at least one supporting member and the plurality of modular units so as to exert a force that retains the at least one supporting member to the plurality of modular units.

15. The method of claim 1, further comprising:
blocking the at least one supporting member from dislodging from the plurality of modular units.

16. The method of claim 1, wherein the plurality of modular units include stairs each having a respective tread and a respective riser, further comprising:
adjusting an angle of inclination of the respective tread relative to that of the respective riser so that the respective treads of the stairs are arranged to be horizontal.

17. The method of claim 16, wherein the adjusting takes place so that the respective treads of the stairs adjust in unison.

* * * * *